(12) United States Patent
Zhou et al.

(10) Patent No.: US 11,432,161 B2
(45) Date of Patent: Aug. 30, 2022

(54) JOINT SCHEDULING IN 5G OR OTHER NEXT GENERATION NETWORK DYNAMIC SPECTRUM SHARING

(71) Applicant: AT&T Intellectual Property I, L.P., Atlanta, GA (US)

(72) Inventors: Yu Zhou, Somerset, NJ (US); Rittwik Jana, Montville, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 123 days.

(21) Appl. No.: 16/908,876

(22) Filed: Jun. 23, 2020

(65) Prior Publication Data

US 2021/0400497 A1    Dec. 23, 2021

(51) Int. Cl.
*H04W 16/14* (2009.01)
*H04W 72/12* (2009.01)
(Continued)

(52) U.S. Cl.
CPC .......... *H04W 16/14* (2013.01); *H04L 5/0082* (2013.01); *H04W 72/0453* (2013.01); *H04W 72/1242* (2013.01); *H04W 72/1263* (2013.01)

(58) Field of Classification Search
CPC ............ H04W 16/14; H04W 72/0453; H04W 72/1242; H04W 72/1263; H04L 5/0082
See application file for complete search history.

(56) References Cited

U.S. PATENT DOCUMENTS 10,813,111 B1 * 10/2020 Mansour ........... H04W 72/1242
2016/0234714 A1 * 8/2016 Basu Mallick ... H04W 28/0278
(Continued)

FOREIGN PATENT DOCUMENTS

EP    3695536 A1 *  8/2020  ........... H04L 1/0003
EP    3713301 A1 *  9/2020  .......... H04W 52/028
(Continued)

OTHER PUBLICATIONS

3GPP, "LTE; Evolved Universal Terrestrial Radio Access Network (E-UTRAN); X2 Application Protocol (X2AP) (3GPP TS 36.423 version 15.7.0 Release 15)," Oct. 1, 2019, 427 pages (8.7.15 E-UTRA—NR Cell Resource Coordination), ETSI 2019, 650 Route des Lucioles, F-06921 Sophia Antipolis Cedex—France.

*Primary Examiner* — Chi H Pham
*Assistant Examiner* — Vladislav Y Agureyev
(74) *Attorney, Agent, or Firm* — Amin, Turocy & Watson, LLP

(57) ABSTRACT

The disclosed technology is directed towards dynamic spread spectrum (DSS) deployments, in which two cells such as an LTE cell and a new radio (NR) cell share available physical resource blocks during a given transmission time interval. The LTE cell and NR cell determine priority values for their user equipments to be scheduled, and both cells provide requested scheduling information including the priority values and requested resource blocks for user equipments in the upcoming transmission time interval. Based on the priority values, a real-time joint scheduler processes the combined scheduling information from both cells to determine how many physical resource blocks of the total available to allocate to the LTE cell and how many to allocate to the NR cell for the next transmission time interval. To avoid collisions, the LTE cell and NR cell modify their respective UE schedules based on their respective number of allocated physical resource blocks.

20 Claims, 14 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 2016/0353374 | A1* | 12/2016 | Hoglund | H04L 1/0009 |
| 2018/0063841 | A1* | 3/2018 | Song | H04W 72/042 |
| 2018/0070369 | A1* | 3/2018 | Papasakellariou | H04W 72/0406 |
| 2018/0115964 | A1* | 4/2018 | Lin | H04W 72/04 |
| 2018/0270838 | A1* | 9/2018 | Maheshwari | H04W 52/346 |
| 2018/0359711 | A1* | 12/2018 | Akkarakaran | H04W 52/242 |
| 2019/0141696 | A1* | 5/2019 | Kim | H04L 5/1469 |
| 2019/0207725 | A1* | 7/2019 | Tayamon | H04W 72/10 |
| 2019/0230549 | A1* | 7/2019 | Wang | H04B 7/0417 |
| 2019/0253100 | A1* | 8/2019 | Liu | H04W 72/02 |
| 2019/0260530 | A1* | 8/2019 | Yl | H04W 72/0453 |
| 2019/0288788 | A1* | 9/2019 | Bengtsson | H04W 52/0216 |
| 2020/0170022 | A1* | 5/2020 | Jones | H04W 4/06 |
| 2020/0195414 | A1* | 6/2020 | Nguyen | H04L 5/16 |
| 2020/0205176 | A1* | 6/2020 | Yu | H04W 72/042 |
| 2020/0304159 | A1* | 9/2020 | Liao | H04B 1/12 |
| 2020/0304417 | A1* | 9/2020 | Yu | H04W 76/12 |
| 2020/0359403 | A1* | 11/2020 | Lee | H04W 72/1284 |
| 2020/0396772 | A1* | 12/2020 | Tirronen | H04W 74/0833 |
| 2021/0037559 | A1* | 2/2021 | Hande | H04W 72/1242 |
| 2021/0160913 | A1* | 5/2021 | Jiang | H04L 5/0053 |
| 2021/0211887 | A1* | 7/2021 | Jones | H04W 72/1242 |
| 2021/0243609 | A1* | 8/2021 | Lei | H04W 16/14 |
| 2021/0266095 | A1* | 8/2021 | Kumar | H04L 5/0042 |
| 2021/0321400 | A1* | 10/2021 | Takeda | H04L 5/0053 |
| 2021/0345360 | A1* | 11/2021 | Yeo | H04W 72/02 |
| 2021/0352567 | A1* | 11/2021 | Kim | H04W 16/02 |
| 2021/0368505 | A1* | 11/2021 | Maki | H04W 16/14 |
| 2021/0385663 | A1* | 12/2021 | Mozaffari | H04L 27/2607 |
| 2021/0385821 | A1* | 12/2021 | Yeo | H04W 72/087 |

FOREIGN PATENT DOCUMENTS

| | | | | |
|---|---|---|---|---|
| WO | WO-2020033628 | A1* | 2/2020 | H04W 76/14 |
| WO | WO-2020098661 | A1* | 5/2020 | H04L 1/16 |

* cited by examiner

JOINT SCHEDULING IN 5G OR OTHER NEXT GENERATION NETWORK DYNAMIC SPECTRUM SHARING

TECHNICAL FIELD

The subject application relates to wireless communications systems in general, and more particularly to New Radio (NR) including fifth generation (5G) cellular wireless communications systems and/or other next generation networks, in which dynamic spectrum sharing (DSS) (also referred to as Long Term Evolution (LTE) LTE-NR coexistence, or LNC), allows for deployment in overlapping spectrum.

BACKGROUND

Fourth Generation Long Term Evolution (4G LTE) and Fifth Generation/New Radio (5G/NR) can be deployed in shared (partially or fully overlapping) spectrum. Dynamic spectrum sharing refers to dynamically allocating resource blocks in time and frequency domains for LTE and NR cells based on the current LTE and 5G traffic. Dynamic spectrum sharing helps mobile operators quickly and cost-effectively roll out 5G services and achieve 5G coverage based on the existing LTE infrastructure, without doing spectrum refarming.

According to the 3rd Generation Partnership Project (3GPP) standard, either the LTE cell site or the 5G cell site can initiate a resource coordination request, which contains a bitmap of 0s and is indicating the resource block allocations. When the overall traffic demand from LTE and NR is larger than the spectrum supply, which cell site (LTE or 5G) initiates the resource coordination request, and how resource blocks are to be divided between LTE and NR, can result in completely different network performance for LTE users and NR users.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
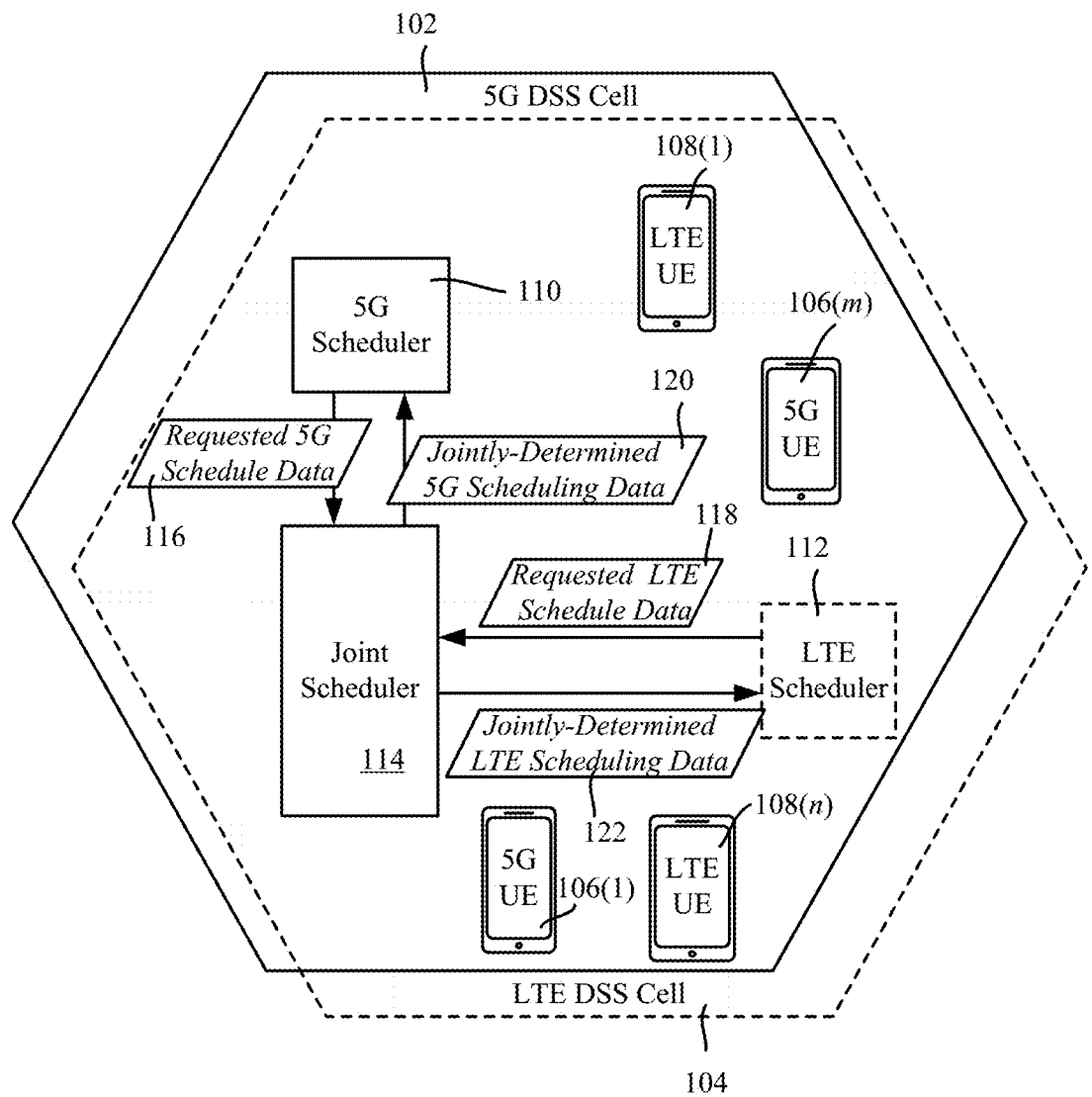
FIG. 1 illustrates an example wireless communication system configured for dynamic spectrum sharing showing joint scheduling of LTE and 5G (NR) user equipments, in accordance with various aspects and embodiments of the subject disclosure.

The technology described herein is generally directed towards improving wireless network and user equipment (UE) performance for both LTE and NR cells, with respect to throughput and scheduling fairness in a dynamic spectrum sharing environment. As can be readily appreciated, this can be significant for 5G applications with high data rate and/or low latency requirements running in a 5G dynamic spectrum sharing network In general, for an upcoming transmission time interval, the scheduler of each cell individually generates a scheduling plan for its connected UEs, and calculates a scheduling priority factor p for each of its UEs, which can be based on the amount of data to be transmitted, quality of service (QoS), channel conditions and possibly other weight factors. Note that weights can be different for LTE and NR cells. Each cell sends its UE scheduling information for the next transmission time interval to a joint scheduler, e.g., in real-time. The scheduling information generally includes the scheduling priority factor p of each UE for which scheduling is desired, along with the number of the estimated physical resource blocks that are requested to be allocated for each UE, assuming a full bandwidth carrier.

In one aspect, the joint scheduler combines the LTE schedule with the 5G schedule, such as by sorting based on the priority factors; that is, for each dynamic spectrum sharing cell pair, the joint scheduler sorts the UEs to be scheduled from both cells according to their scheduling priority factors. If the number of the overall estimated resource blocks is larger than the carrier bandwidth, the joint scheduler reduces the number of requested physical resource blocks based on the priority factors to meet the physical resource block limit. In one implementation, the joint scheduler removes the lower priority UEs and/or resource blocks that exceed the carrier bandwidth from the final UE selection list. The joint scheduler splits the final UE selection list into a LTE UE list and a 5G UE list for each dynamic spectrum sharing cell pair, and sends the LTE UE list to the dynamic spectrum sharing LTE cell and the 5G UE list to the dynamic spectrum sharing 5G cell. The LTE and NR cells execute the UE scheduling in the order based on their respective UE list received from the joint scheduler.

In an alternative implementation, the joint scheduler can use the sorted priority information to determine how many of the available resource blocks are to be allocated to the LTE cell and to the 5G cell, respectively. The respective cells can then determine which of their respective UEs to schedule given their respective allocated physical resource blocks, generally according to their respective priority factors. For example, based on the priority data provided to the joint scheduler, the joint scheduler can determine that for the next transmission time interval, the LTE cell is allocated twenty-two of the total available resource blocks (e.g., of fifty total), while the 5G cell is allocated twenty-eight resource blocks. Each cell can then schedule its UEs accordingly. In one implementation, to avoid collisions in the transmission time interval, the LTE cell uses the (e.g., twenty-two) lowest frequency physical resource blocks for scheduling the LTE UEs, while the 5G cell uses the (e.g., twenty-eight) highest frequency physical resource blocks for scheduling the 5G UEs. The next transmission time interval, the allocated physical resource block counts can change.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in FIG. 1, a 5G cell 102 (solid line block) and LTE cell 104 (dashed line block) each comprising respective network equipment are configured for dynamic spectrum sharing as described herein. Some number 106(1)-106(m) of 5G user equipments (UEs) are communicating via the network equipment of the 5G cell 102, while some number 108(1)-108(n) of LTE UEs are communicating via the network equipment of the LTE cell 104.

The network equipment of the 5G cell 102 is configured with a 5G scheduler 110 for scheduling the 5G UEs 106(1)-106(m). Similarly, the network equipment of the LTE cell 104 is configured with an LTE scheduler 112 for scheduling the LTE UEs 108(1)-108(n).

As described herein, a joint scheduler 114 receives requested scheduling data 116 from the 5G scheduler 110 and requested scheduling data 118 from the LTE scheduler 112, processes a combination of the requested scheduling data, and returns 5G scheduling data 120 to the 5G scheduler 110 and LTE scheduling data 122 to the LTE scheduler 112. As will be understood, when significant data traffic is occurring, the returned scheduling data can instruct the 5G scheduler 110 and/or the LTE scheduler 112 to use less physical resource blocks than requested.

It should be noted that the joint scheduler 114 can be implemented as a centralized scheduler in the network equipment of the LTE cell 104, such as when the 5G cell uses the LTE cell as an anchor cell. Alternatively, the joint scheduler 114 can be implemented in the network equipment of the of the 5G cell 102. It is also feasible for the joint scheduler 114 to be located remotely from the cells.

Figure 2:
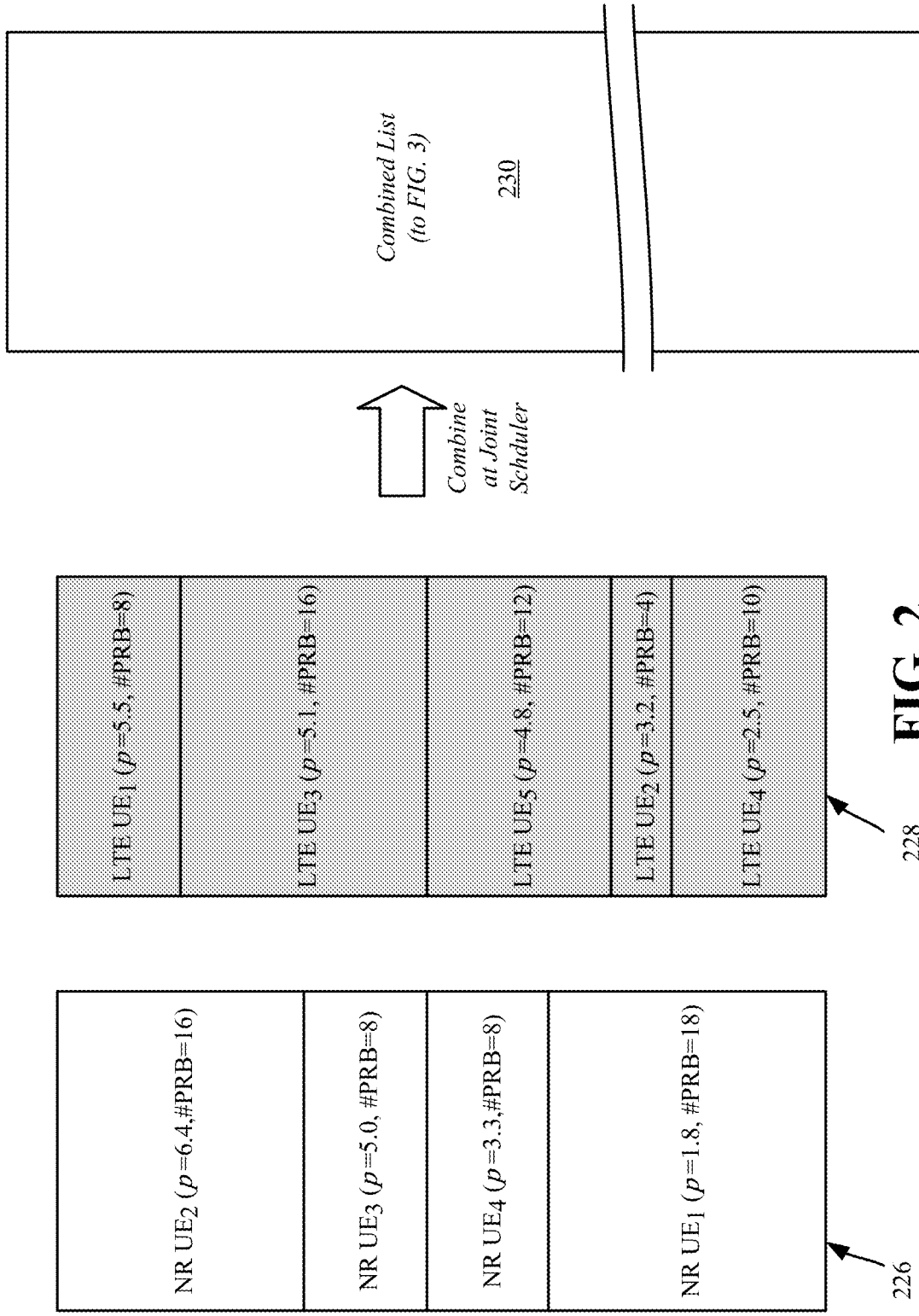
FIGS. 2-4 illustrate scheduling information communicated from LTE and 5G schedulers to a joint scheduler, for processing by the joint scheduler to allocate physical resource blocks based on priority information, in accordance with various aspects and embodiments of the subject disclosure.

As represented in FIG. 2, the scheduler of each cell makes a scheduling plan individually for its connected UEs, as shown in FIG. 2 via NR (5G) requested scheduling plan 226 and LTE requested scheduling plan 228. To this end, the 5G scheduler 110 (FIG. 1) calculates a scheduling priority factor p for each of the 5G UEs to be scheduled, such as based on the amount of data to be transmitted, QoS, channel conditions and possibly other weight factors, such as QoS-based class identifiers (QCI). Similarly, the LTE scheduler 112 (FIG. 1) calculates a scheduling priority factor p for each of its LTE UEs to be scheduled. Note that the requested scheduling plans 226 and 228 are shown in FIG. 2 in priority order from highest to lowest, however as will be understood, this is not a requirement.

For example, the scheduling priority factor in Proportional Fairness (PF) scheduling can be defined as:

$$p_{PF} = \frac{r^\alpha}{\bar{r}^\beta}$$

where r denotes the data rate potentially achievable for a UE in the present time slot, and $\bar{r}$ is the historical average data rate of this UE. The $\alpha$ and $\beta$ values are weights used to tune the "fairness" of the scheduler, e.g., as set by the vendor. As can be seen, a UE in good channel conditions is potentially able to achieve a higher data rate, whereby the numerator is larger, providing a higher priority value in the upcoming time slot, which is desirable as scheduling that UE with higher priority tends to increase overall cell throughput. At the same time, the denominator $\bar{r}^\beta$ decreases as a given UE does not get scheduled, because its historical average data rate goes lower, (which could be because it had a low potential data rate $r^\alpha$ as its numerator) thereby increasing such a non-served UE's scheduling priority over time as calculated for each subsequent transmission time interval, particularly if that UE's potential data rate also increases. For a given UE, its current signal quality data can be used to determine the numerator, and a mapping table can be used to track the historical average for the denominator.

It should be noted that although the scheduling priority factor is sent along with the estimated/requested number of physical resource blocks, additional information can be sent as well. For example, QCI data, latency requirements and possibly other parameters such as subscriber type can be sent for use in allocating physical resource blocks by the joint scheduler, if not already factored into the priority values.

Each cell sends its respective UE requested scheduling data, such as shown in blocks 226 and 228, to the joint scheduler in real-time. The requested scheduling data includes but is not limited to the scheduling priority factor p of each UE, and the number of the estimated physical resource blocks allocated for each UE, assuming a full bandwidth carrier. The joint scheduler can combine these lists into a combined list 230, however the combination need not be made in a physical data structure, but rather can be logical that "combines" or "merges" by pulling information from each list.

Figure 3:
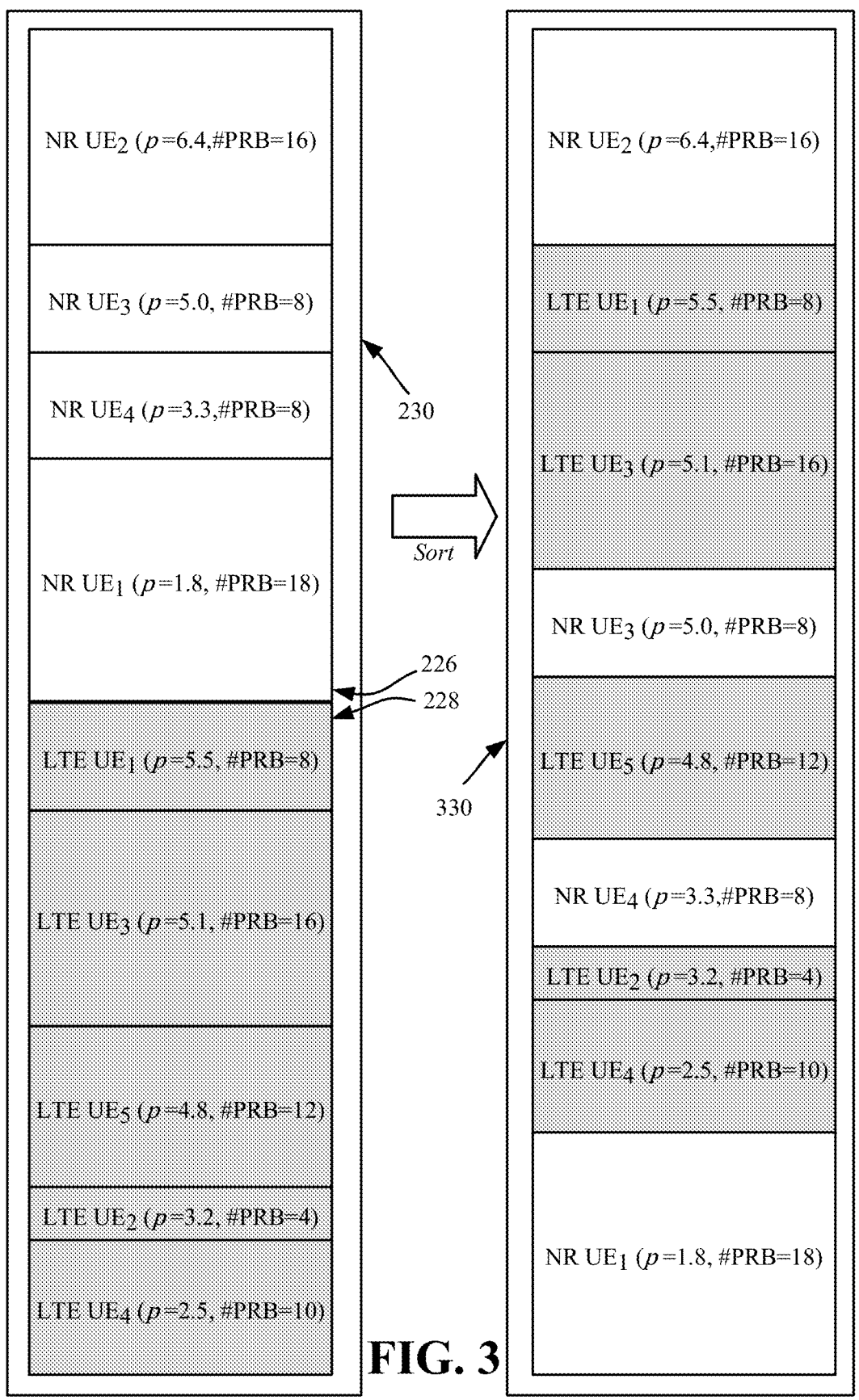

FIG. 3 shows the concept of a combined list 230; note however such a list can be made from the scheduling plans 226 and 228 remaining in respective, separate data structures. Based on the scheduling plans 226 and 228, the joint scheduler 114 (FIG. 1) sorts the UEs to be scheduled from both cells according to their scheduling priority factors into a joint schedule 330. Note that for efficiency, the joint scheduler can stop the sorting once the total physical resource block limit is reached or exceeded.

Figure 4:
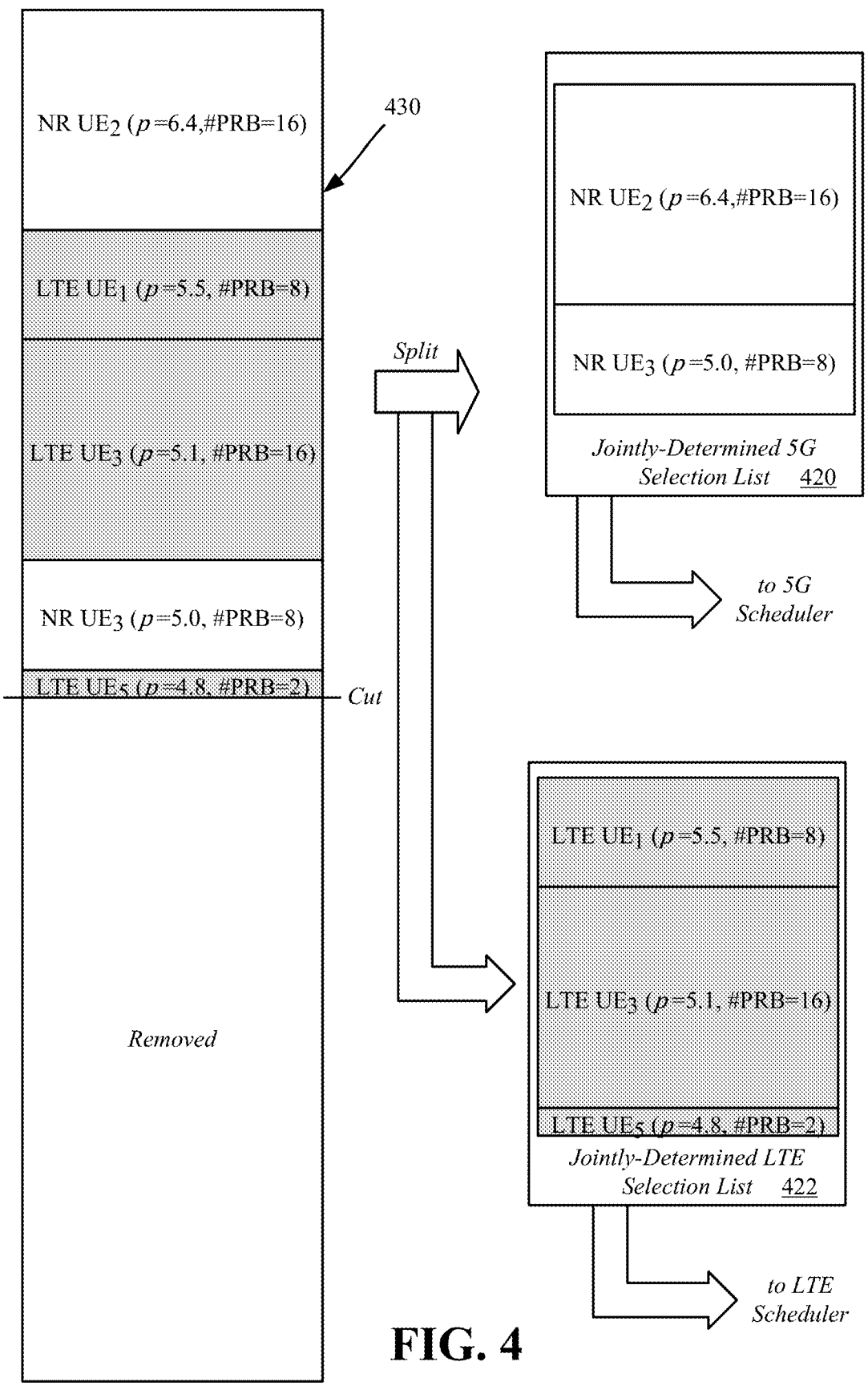

As shown in FIG. 4, if the number of the overall estimated physical resource blocks is larger than the carrier bandwidth, that is, the requested number of physical resource blocks exceeds the total physical resource block limit, the joint scheduler removes those UEs and physical resource blocks that exceed the carrier bandwidth from the final UE selection list 430. Note that a UE can remain on the list with a lesser number of physical resource blocks that requested; e.g., the LTE scheduler had requested twelve physical resource blocks for LTE UEs, but only is allocated two by the joint scheduler because the physical resource block limit of fifty would be otherwise exceeded.

In the example of FIG. 4, the joint scheduler splits the final UE selection list 430 into a NR UE list 420 and an LTE UE list 422 for each DSS cell pair, and sends the jointly determined NR UE list 420 to the dynamic spectrum sharing NR cell and the LTE UE list 422 to the dynamic spectrum sharing LTE cell. The NR and LTE cells execute the UE scheduling in the order based on their respective UE lists received from the joint scheduler.

Figure 5:
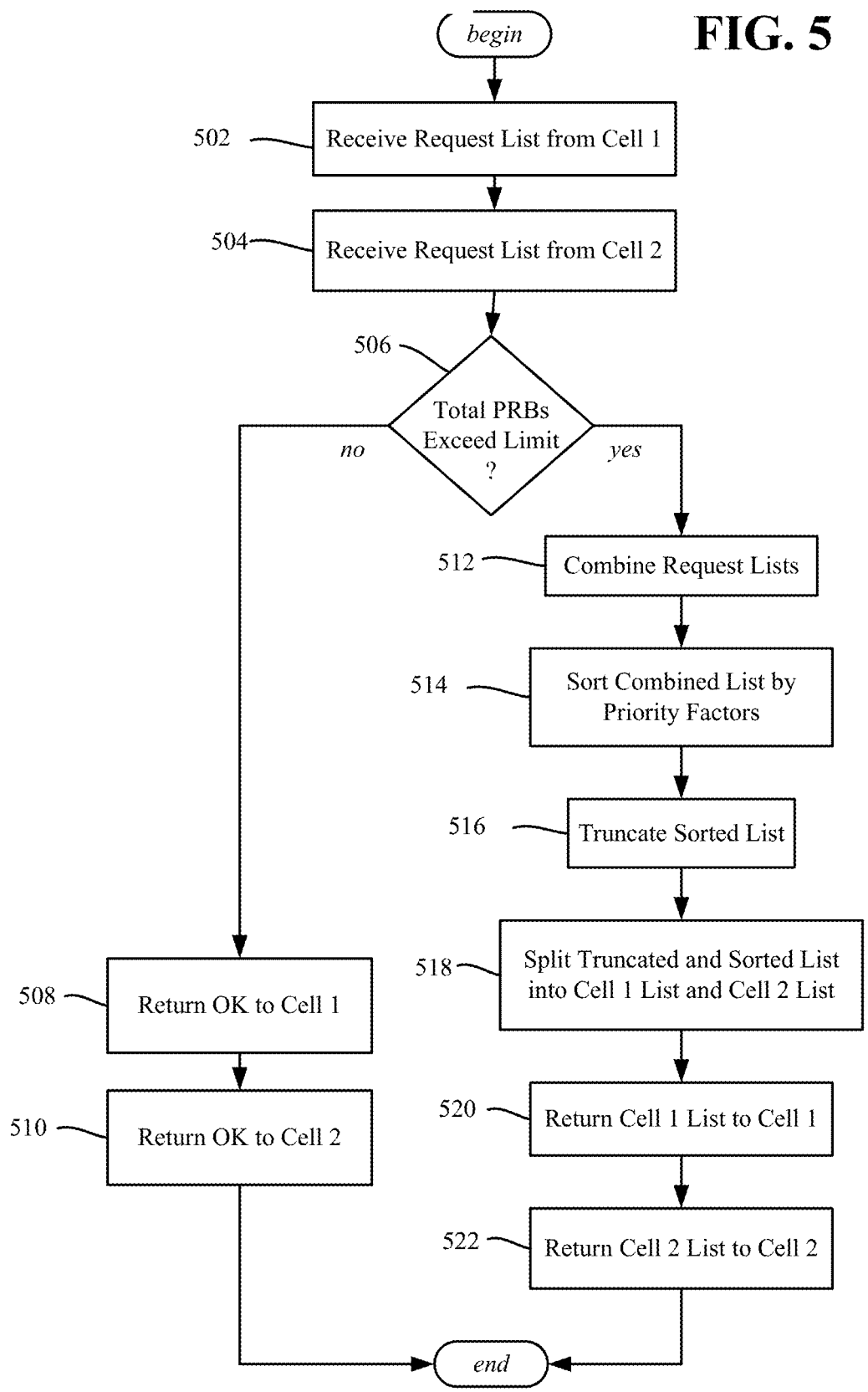
FIG. 5 is a flow diagram showing example operations performed by a joint scheduler to combine requested schedules of spectrum sharing cells based on priority information, in order to allocate physical resource blocks based on the priority information, in accordance with various aspects and embodiments of the subject disclosure.

FIG. 5 is a flow diagram showing example operations of a dynamic spectrum sharing joint scheduler, beginning at operations 502 and 504 where two dynamic spectrum sharing cells Cell 1 and Cell 2 provide their requested scheduling data (e.g., lists) to the joint scheduler. Note that Cell 1 can be an NR cell and Cell 2 can be an LTE cell, or vice-versa, however any two dynamic spectrum sharing cells, such as 5G and a future (e.g., 6G) cell can benefit from the technology described herein, and thus two cells are described in general.

Operation 506 represents determining whether the total number of resource blocks summed from both lists exceeds the total physical resource block limit. If not, then the requested scheduling data lists need not be further processed, and each cell is notified that the submitted list is acceptable to use as is, as represented via operations 508 and 508. Otherwise the joint scheduler needs to combine and sort the lists based on priority as described herein.

Operation 512 combines the requested scheduling lists, which as described above need not be a physical combination, but rather can be a processing of the two lists considered together. Operation 514 represents sorting the "combined" list by priority factors, which can be by pulling the highest priority UE that remains on either list and adding the pulled UE along with its allocated resource blocks to a joint list. Another way this can be done is to directly add the highest priority UE and its allocated resource blocks to a Cell 1 or Cell 2 list. As described above, this sorting operation can be short-circuited by keeping a count of total physical resource blocks allocated thus far, and stopping when the limit is reached or exceeded. In the event of a tied priority value, some tiebreaking scheme can be used, e.g., randomly, or alternate between LTE and NR when sorting relative to the last time there was a tie.

Operation 516 represents truncating the sorted list by removing any UEs with requested resource blocks that would entirely exceed the limit. For a UE having a requested number of resource blocks that partially but not entirely exceed the limit, the truncating operation can reduce the number of resource blocks allocated to the lowest priority UE that remains on the list to match the limit.

Operation 518 splits the combined, sorted and truncated list into a Cell 1 scheduling list and a Cell 2 scheduling list. These lists are returned to their respective cells via operations 520 and 522.

Figure 6:
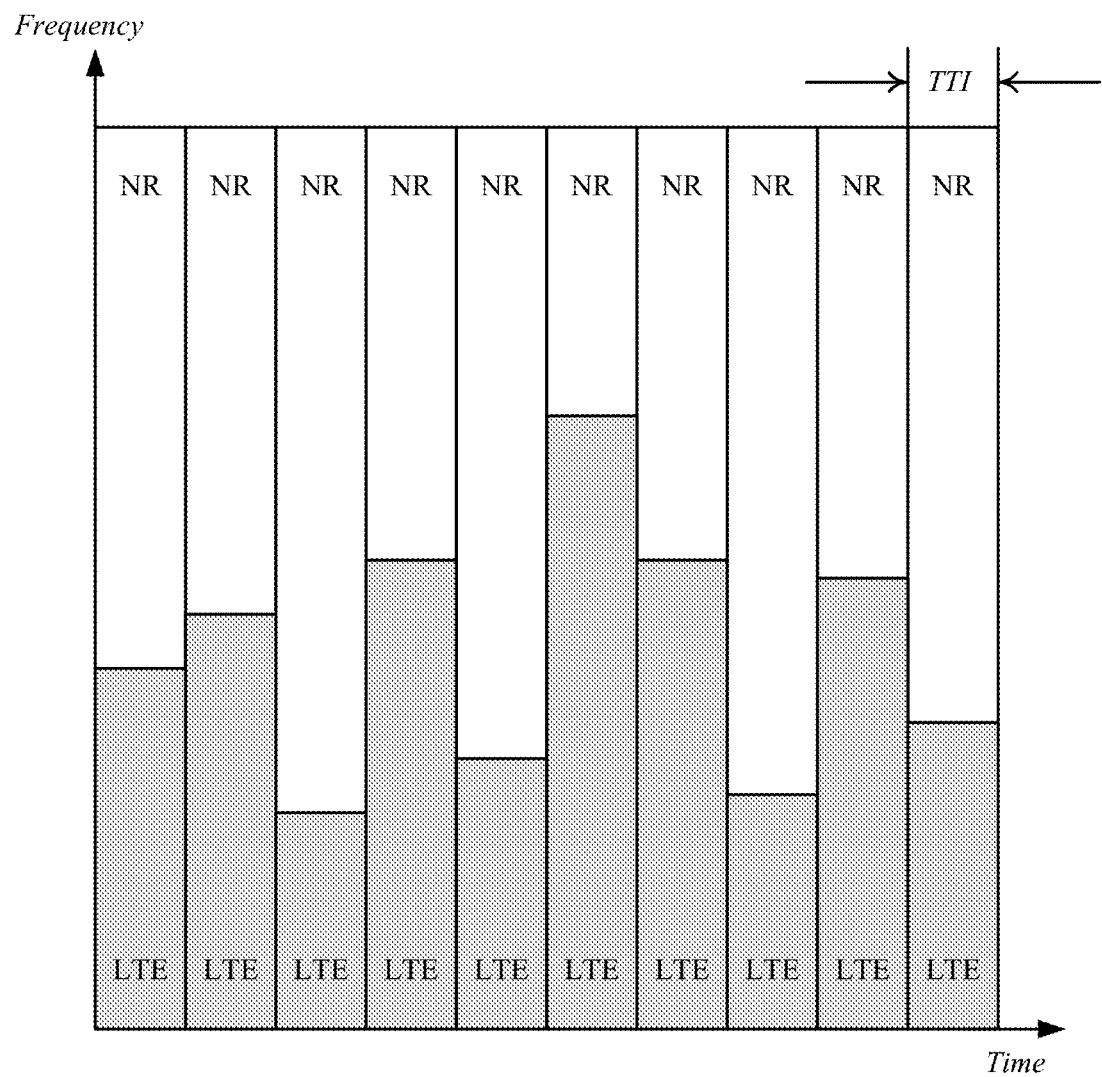
FIG. 6 is an example representation of priority-based resource block allocations over various transmission time intervals in a spectrum sharing environment, in accordance with various aspects and embodiments of the subject disclosure.

FIG. 6 shows an example of how physical resource blocks can be jointly allocated between a new radio cell site and an LTE cell site in a dynamic spectrum sharing environment. In FIG. 6, the NR physical resource blocks are shown (not individually for purposes of illustration) as unshaded blocks, while the LTE physical resource blocks are shown as shaded, per transmission time interval. As depicted, the total number of physical resource blocks is never exceeded, and the number allocated to each cell site for any given transmission time interval (TTI) varies, based on priority-based allocation as described herein. Note that the entire carrier bandwidth (up to the physical resource blocks limit) is shown as being allocated for each transmission time interval in the example of FIG. 6, e.g., because data traffic is heavy, but it is feasible that at times less than the total number can be allocated for any given transmission time interval, such as when data traffic is light.

To avoid collisions, in the example of FIG. 6, the LTE cell uses the allocated physical resource blocks from the lowest frequency towards the highest, while the NR cell uses the allocated physical resource blocks from the highest frequency towards the lowest. It is basically identical to do the opposite, LTE highest to lowest frequency, NR lowest to highest. In another scheme, the joint scheduler can send a bitmap or the like, (e.g., LTE uses the zeros, NR the ones, or vice versa), which facilitates interleaving LTE and NR resource block frequencies.

As can be readily appreciated, there are various ways to implement priority-based joint scheduling, which can have reduced data communication and/or consume less resources. For example, the UEs need not be identified to the joint scheduler, only the priority values and requested resource blocks. The joint scheduler need not return a list, but rather the returned scheduling data can simply be a count of the physical resource blocks allocated to each cell.

Figure 7:
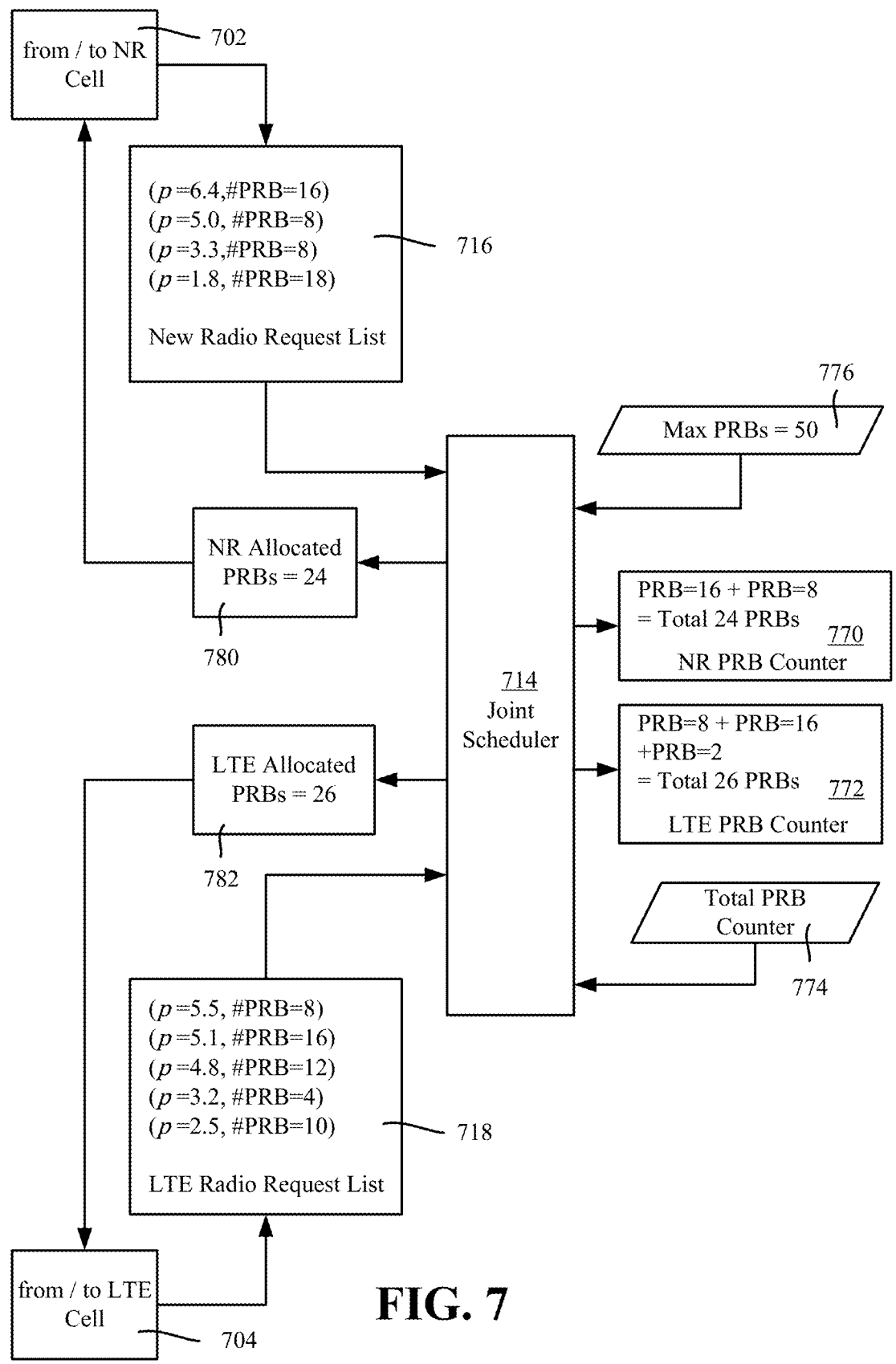
FIG. 7 is a block diagram representing joint processing of priority-based scheduling requests in a spectrum sharing environment to allocate resource blocks based on priority information, in accordance with various aspects and embodiments of the subject disclosure.

By way of example, FIG. 7 shows how an NR cell 702 and an LTE cell 704 can send scheduling request lists 716 and 718, respectively, to a joint scheduler 714 with only the priority values and associated requested number of physical resource blocks per priority value. Again, the lists 716 and 718 are shown in priority order, but need not be.

In FIG. 7, the joint scheduler 714 scans the two source lists 716 and 718 and takes the highest priority value that is present. The corresponding physical resource block (PRB) value is added to either an NR counter 770 or an LTE counter 772, (e.g., both were initialized to zero) depending on the source list from which it was read. The joint scheduler marks this entry as having been handled (or removes it from the source list in some other way). In this example, the joint scheduler also updates a total physical resource block (PRB) counter 774 (or sums the two counters 770 and 772) to reflect the allocated physical resource blocks, so that the process can end when the maximum physical resource block number (e.g., 50, block 776) is reached (or exceeded, which is followed by a reduction).

Until the limit is reached, the joint scheduler 714 repeats the process for the (next) highest priority value and physical resource block pair that remains unhandled. When the limit is reached, (and if exceeded any reduction is made to the last count that was added), the respective NR and LTE counts are returned (blocks 780 and 782) to the respective NR cell and LTE cells 702 and 704.

Figure 8:
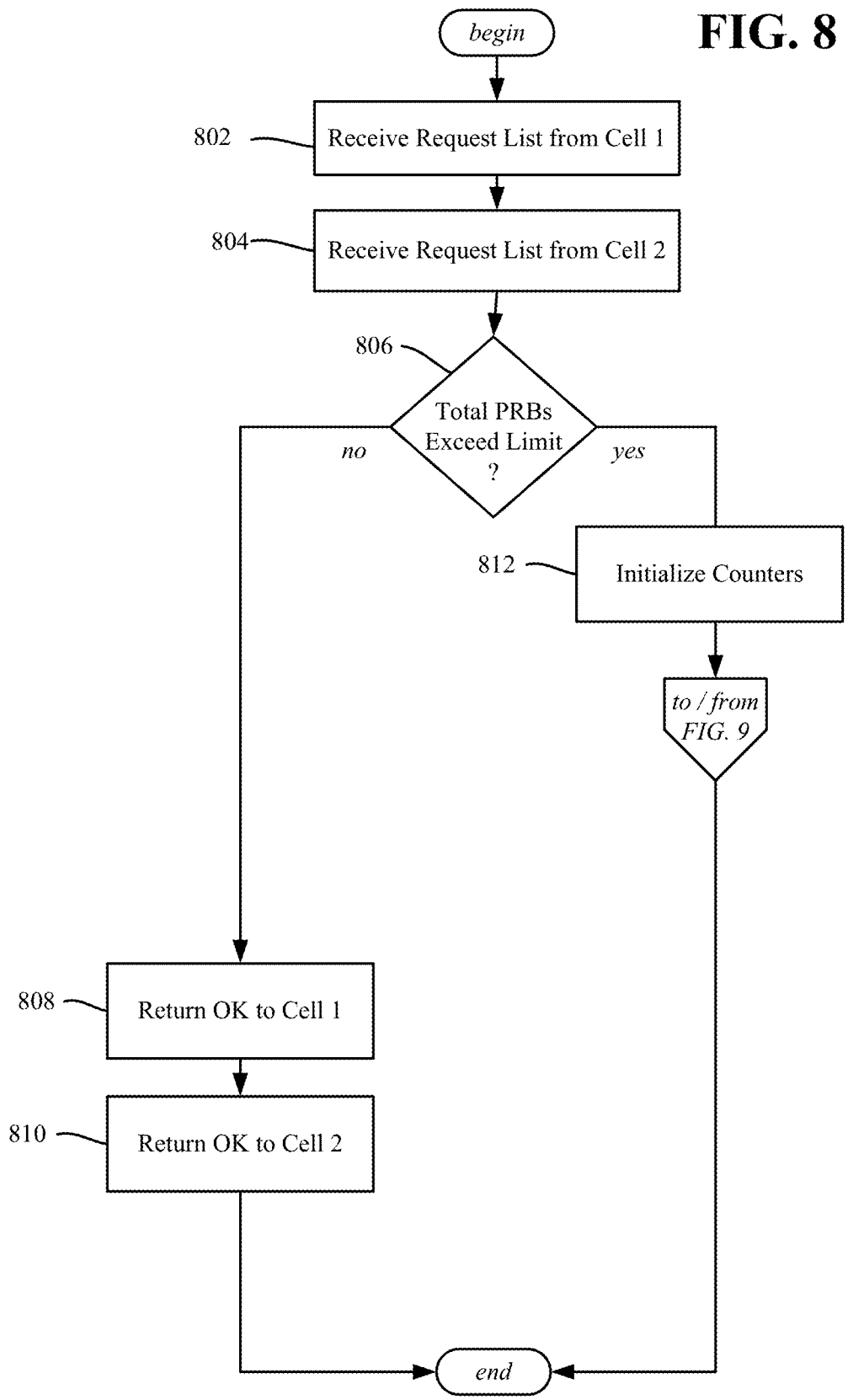
FIGS. 8 and 9 comprise a flow diagram showing example operations performed by a joint scheduler to allocate physical resource blocks in a spectrum sharing environment based on priority information, in accordance with various aspects and embodiments of the subject disclosure.
Figure 9:
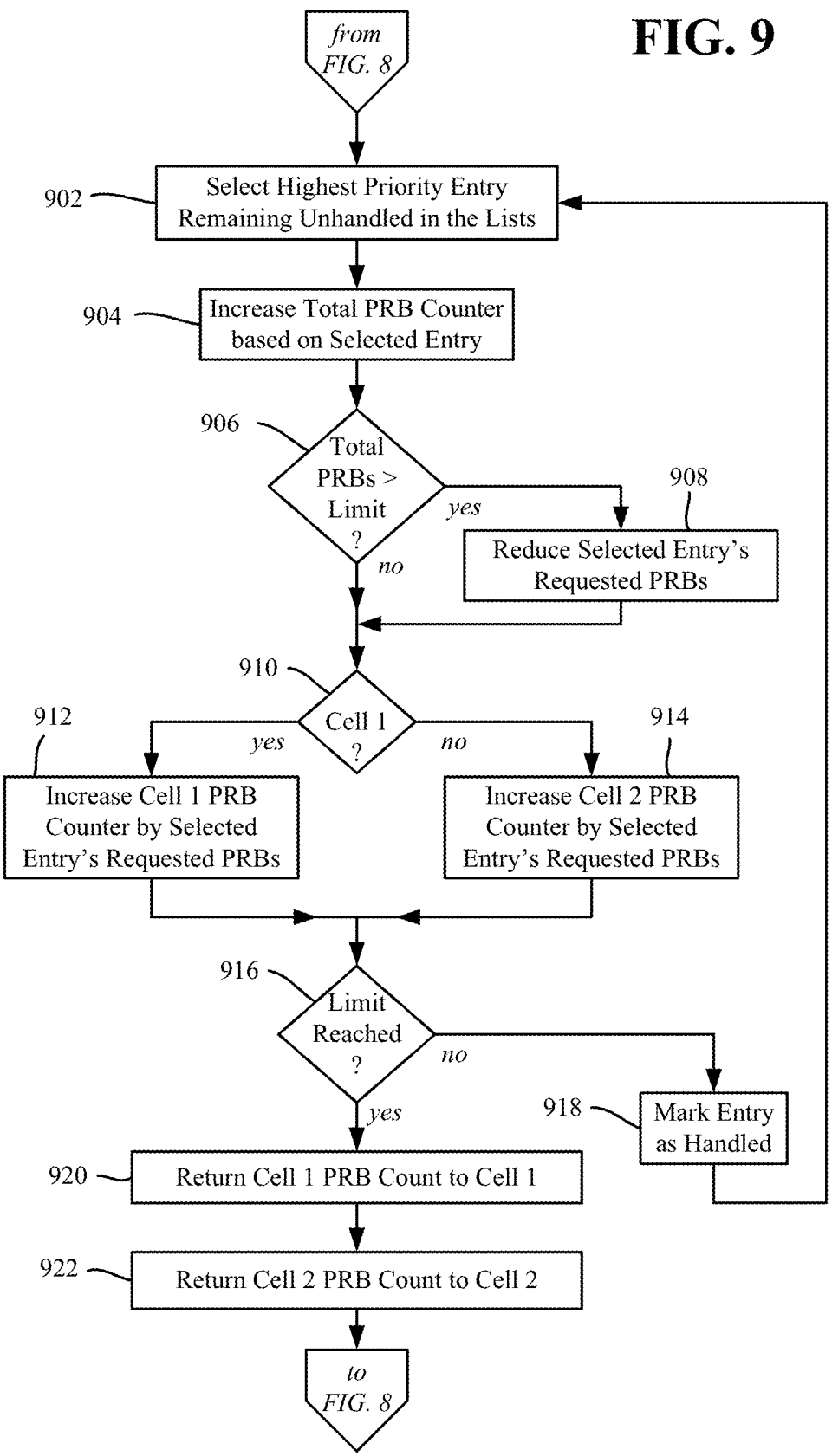

FIGS. 8 and 9 summarize the logic of FIG. 7 via example operations. Operations 502 and 804 represent two dynamic spectrum sharing cells Cell 1 and Cell 2 providing their requested scheduling data (e.g., entries of priority value, requested PRBs pairings) to the joint scheduler. Note that Cell 1 can be an NR cell and Cell 2 can be an LTE cell, or vice-versa, or any other two dynamic spectrum sharing cells.

Operation 806 represents determining whether the total number of resource blocks summed from both lists exceeds the total physical resource block limit. If not, then the requested scheduling data lists need not be further processed, and each cell is notified that the submitted list is acceptable to use as is, as represented via operations 808 and 808.

Otherwise the joint scheduler needs to determine the physical resource block (PRB) allocations based on priority as described herein. Operation 812 represents initializing the counters, e.g., to zero in this example. The process continues to operation 902 of FIG. 9.

Operation 902 of FIG. 9 represents selecting as the first entry the highest priority value from the lists that has not been handled. Again, some tiebreaking mechanism can be used if the two source lists have an entry with the same priority value. Operation 904 represents increasing the total PRB counter based on the requested PRB number in selected entry. If the total is not greater than the limit, as evaluated at operation 906, the process continues. Otherwise the selected entry PRB number is reduced to match the total PRB allocation limit at operation 908.

If the entry was from the Cell 1 source list as evaluated at operation 910, the Cell 1 PRB allocation counter is increased at operation 912 by the number of requested PRBs (which may have been reduced via operation 908) accordingly. Otherwise, the Cell 2 PRB allocation counter is increased at operation 914.

Operation 916 evaluates whether the total PRB allocation limit was reached. If not, at operation 918 the entry is marked in some way as having been handled (which can be by flagging, or removing the entry from its source list or the like), and the process continues by returning to operation 902 for the next highest priority value, and so on.

When the limit is reached at operation 916, operation 916 branches to operation 920, which returns the Cell 1 PRB count to Cell 1. Similarly, operation 922 returns the Cell 2 PRB count to Cell 2.

As can be seen, in the examples of FIGS. 7-9, the UE identities can be irrelevant to the joint scheduler, and only allocated PRB counts need be returned. Indeed, in the examples of FIGS. 7-9, it is up to the individual cells to map their UEs to the number of physical resource blocks that were allocated by the joint scheduler. This can be strictly by priority values, but the mapping can be based on other considerations. For example, consider that because of truncation, one physical resource block remains for a given user equipment; rather than wait for that UE's priority value to increase to where the last physical resource block for that UE eventually gets allocated (which can be awhile if higher priority traffic keeps occurring), the cell site can use one of its allocated physical resource blocks to be done with that UE's transmission.

Notwithstanding, it is feasible for a joint scheduler to be involved in individual UE scheduling. For example, rather than always truncate the lowest priority UE's requested resource blocks, the joint scheduler can reduce another UE's requested resource blocks. As a more particular example, consider that one very-high priority UE is getting all or almost all of the resource blocks per transmission time interval for some (e.g., relatively large) number of transmission time intervals. This can adversely impact the other cell's performance. Although as described above this eventually will cause the priority values of other UEs to increase, this may be for too long of a wait time. Thus, occasionally, such as randomly or according to an appropriate algorithm, the joint scheduler can truncate some of the very-high priority UE's physical resource blocks. To this end, the UEs' identities (not necessarily actual IDs but any suitable some differentiation scheme) and each UE's allocated physical resource blocks need to be returned, such as in FIG. 4 (although the priority value needed not be returned), rather than the jointly allocated PRB counts.

Figure 10:
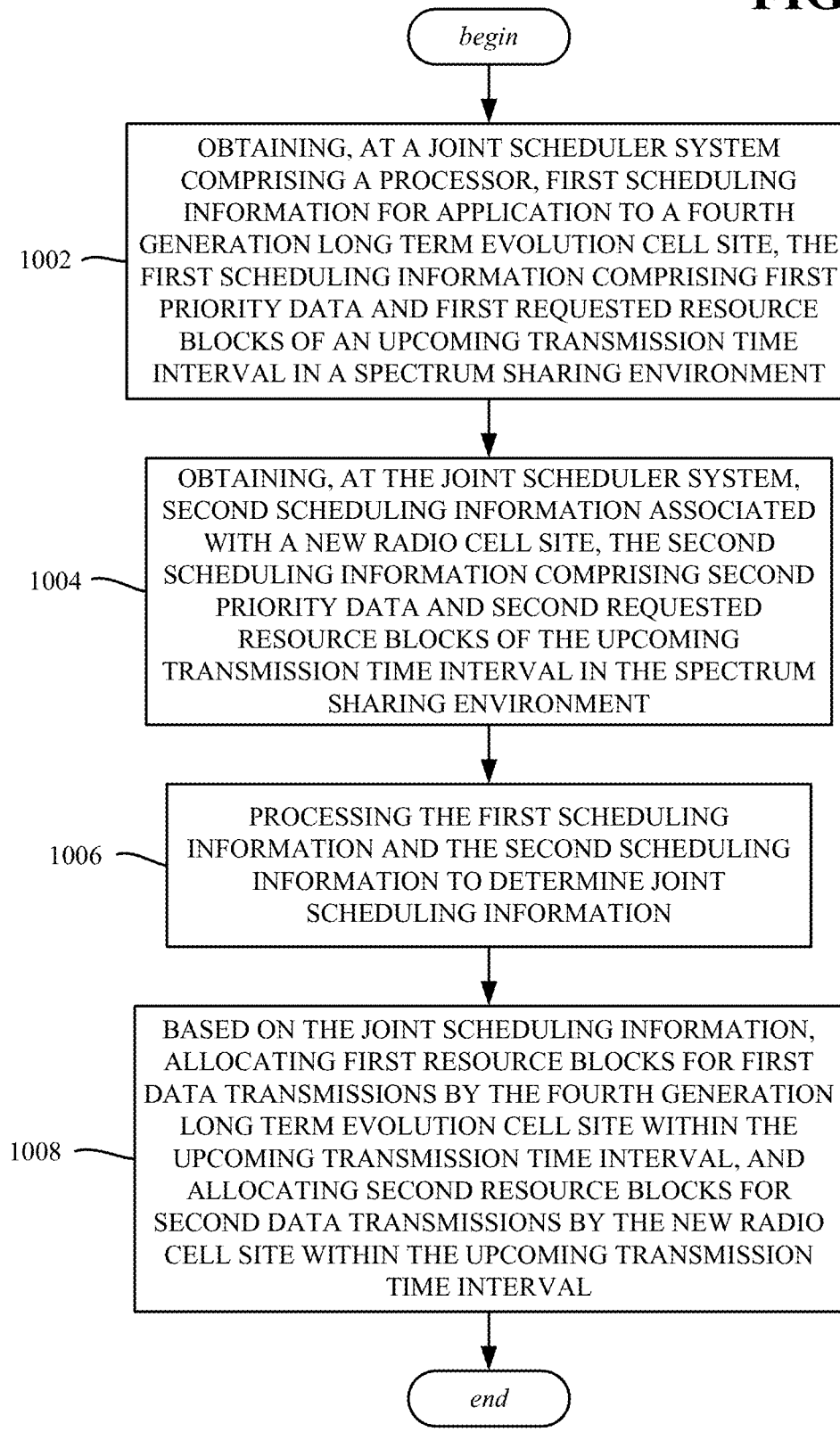
FIG. 10 illustrates example operations of a joint scheduler system in a spectrum sharing environment to allocate resource blocks to an LTE cell and a new radio cell based on priority data, in accordance with various aspects and embodiments of the subject disclosure.

One or more example aspects are represented in FIG. 10, and can correspond to operations of a method. Operation 1002 represents obtaining, at a joint scheduler system comprising a processor, first scheduling information for application to a fourth generation long term evolution cell site, the first scheduling information comprising first priority data and first requested resource blocks of an upcoming transmission time interval in a spectrum sharing environment. Operation 1004 represents obtaining, at the joint scheduler system, second scheduling information associated with a new radio cell site, the second scheduling information comprising second priority data and second requested resource blocks of the upcoming transmission time interval in the spectrum sharing environment. Operation 1006 represents processing the first scheduling information and the second scheduling information to determine joint scheduling information. Operation 1008 represents, based on the joint scheduling information, allocating first resource blocks for first data transmissions by the fourth generation long term evolution cell site within the upcoming transmission time interval, and allocating second resource blocks for second data transmissions by the new radio cell site within the upcoming transmission time interval.

Aspects can include returning first quantity information to the fourth generation long term evolution cell site corresponding to a first number of the first resource blocks allocated for first data transmissions, and returning second quantity information to the new radio cell site corresponding to a second number of second resource blocks allocated for the second data transmissions.

Processing the first scheduling information and the second scheduling information to determine the joint scheduling information can include sorting, based on the first priority data and the second priority data, the first scheduling information and second scheduling information into the joint scheduling information.

Allocating the first resource blocks for the first data transmissions can include reducing a first quantity of the first allocated resource blocks relative to a second quantity of the first requested resource blocks.

Obtaining the first scheduling information can include receiving respective first user equipment identification information in conjunction with respective first priority values and respective first requested resource block counts, and obtaining the second scheduling information can include receiving respective second user equipment identification information in conjunction with respective second priority values and respective second requested resource block counts.

Aspects can include returning a first allocation map to the fourth generation long term evolution cell site corresponding to first ones of the first resource blocks that are allocated for the first data transmissions, and returning a second allocation map to the new radio cell site corresponding to second ones of the second resource blocks that are allocated for the second data transmissions.

Figure 11:
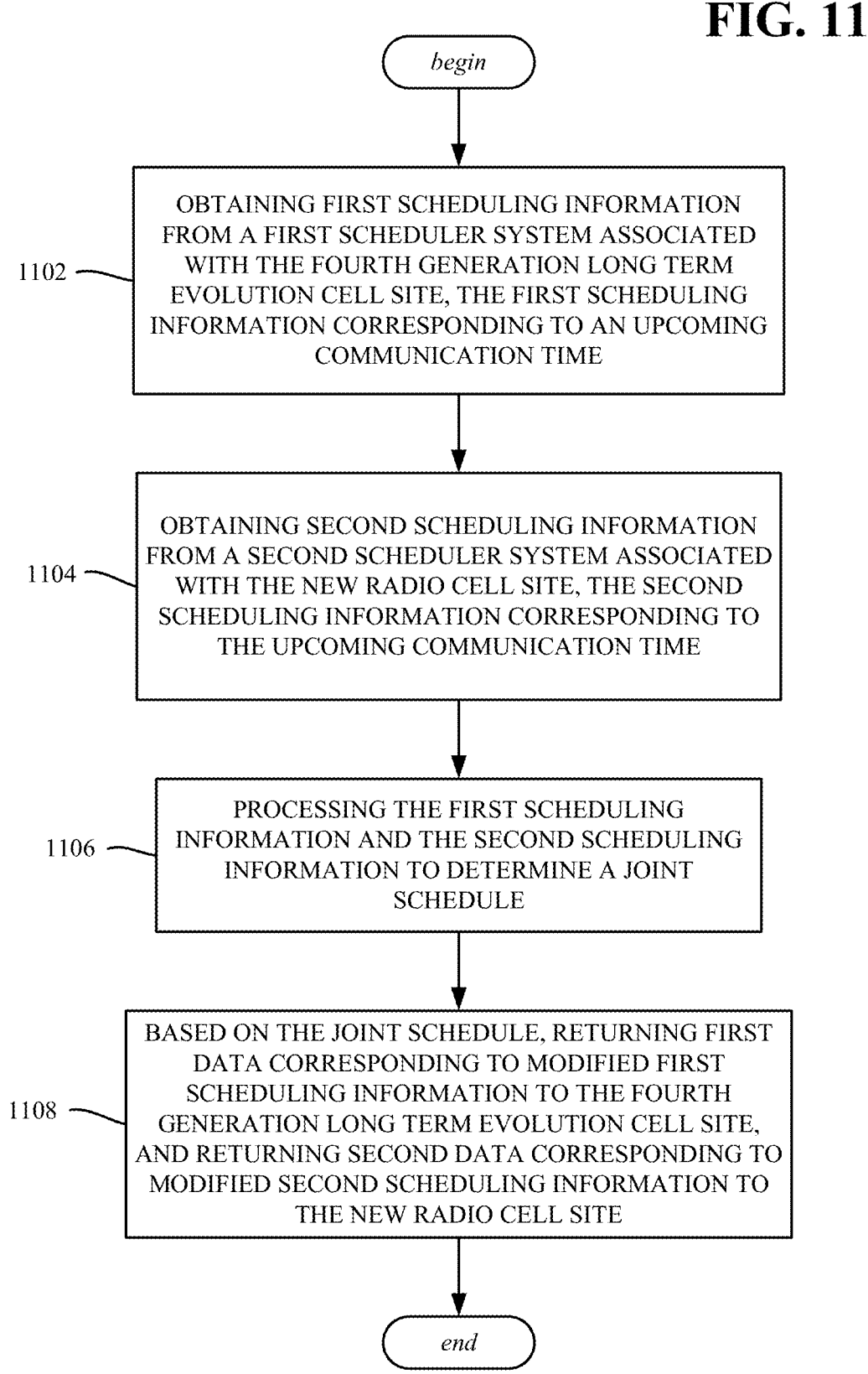
FIG. 11 illustrates example operations of a joint scheduler system, including to determine a joint schedule for allocating resource blocks in a spectrum sharing environment based on priority data, in accordance with various aspects and embodiments of the subject disclosure.

One or more example aspects are represented in FIG. 11, and can correspond to a system, comprising a processor, and a memory that stores executable instructions that, when executed by the processor of the system configured for spectrum sharing between a fourth generation long term evolution cell site and a new radio cell site, facilitate performance of operations. Example operation 1102 represents obtaining first scheduling information from a first scheduler system associated with the fourth generation long term evolution cell site, the first scheduling information corresponding to an upcoming communication time. Example operation 1104 represents obtaining second scheduling information from a second scheduler system associated with the new radio cell site, the second scheduling information corresponding to the upcoming communication time. Example operation 1106 represents processing the first scheduling information and the second scheduling information to determine a joint schedule. Example operation 1108 represents, based on the joint schedule, returning first data corresponding to modified first scheduling information to the fourth generation long term evolution cell site, and returning second data corresponding to modified second scheduling information to the new radio cell site.

The upcoming communication time can be represented as a transmission time interval. The first scheduling information can include a first group of long term evolution respective user equipment identifiers, first respective priority data and first respective requested resource blocks, and the second scheduling information can include a second group of new radio respective user equipment identifiers, second respective priority data and second respective requested resource blocks. Processing the first scheduling information and the second scheduling information to determine the joint schedule can include merging at least part of the first group and at least part of the second group into a combined group of fourth generation long term evolution user equipment identifiers with the first respective priority values and new radio user equipment identifiers with the second respective priority values, and sorting the combined group by the first and the second respective priority values.

The first scheduling information can include a first group of long term evolution user equipment identifiers with first respective priority values and first respective requested resource block data, wherein the second scheduling information can include a second group of new radio user equipment identifiers with second respective priority values and second respective requested resource block data, and processing the first scheduling information and the second scheduling information to determine the joint schedule can include merging the first group and the second group into a combined group of fourth generation long term evolution user equipment identifiers with the first respective priority values and new radio user equipment identifiers with the second respective priority values, and sorting the combined group by the first and the second respective priority values.

The first scheduling information can correspond to a total number of resource blocks requested by the first scheduler system, and returning the first data corresponding to the modified first scheduling information can include returning a reduced number of resource blocks, relative to the total number of resource blocks requested by the first scheduler system, to the fourth generation long term evolution cell site.

The second scheduling information can correspond to a total number of resource blocks requested by the second scheduler system, and returning the second data corresponding to the modified second scheduling information can include returning a reduced number of resource blocks, relative to the total number of resource blocks requested by the second scheduler system, to the new radio cell site.

The first scheduling information can correspond to a first total number of resource blocks requested by the first scheduler system and a second total number of resource blocks requested by the second scheduler system, and returning the first data corresponding to the modified first scheduling information can include returning a first map indicating which resource blocks of the first total number of resource blocks are allocated to the first scheduler system, and returning a second map indicating which resource blocks of the second total number of resource blocks are allocated to the second scheduler system.

Obtaining second scheduling information from the second scheduler associated with the new radio cell site can include receiving the second scheduling information, from the new radio cell site, at a joint scheduler system operating at the fourth generation long term evolution cell site.

Figure 12:
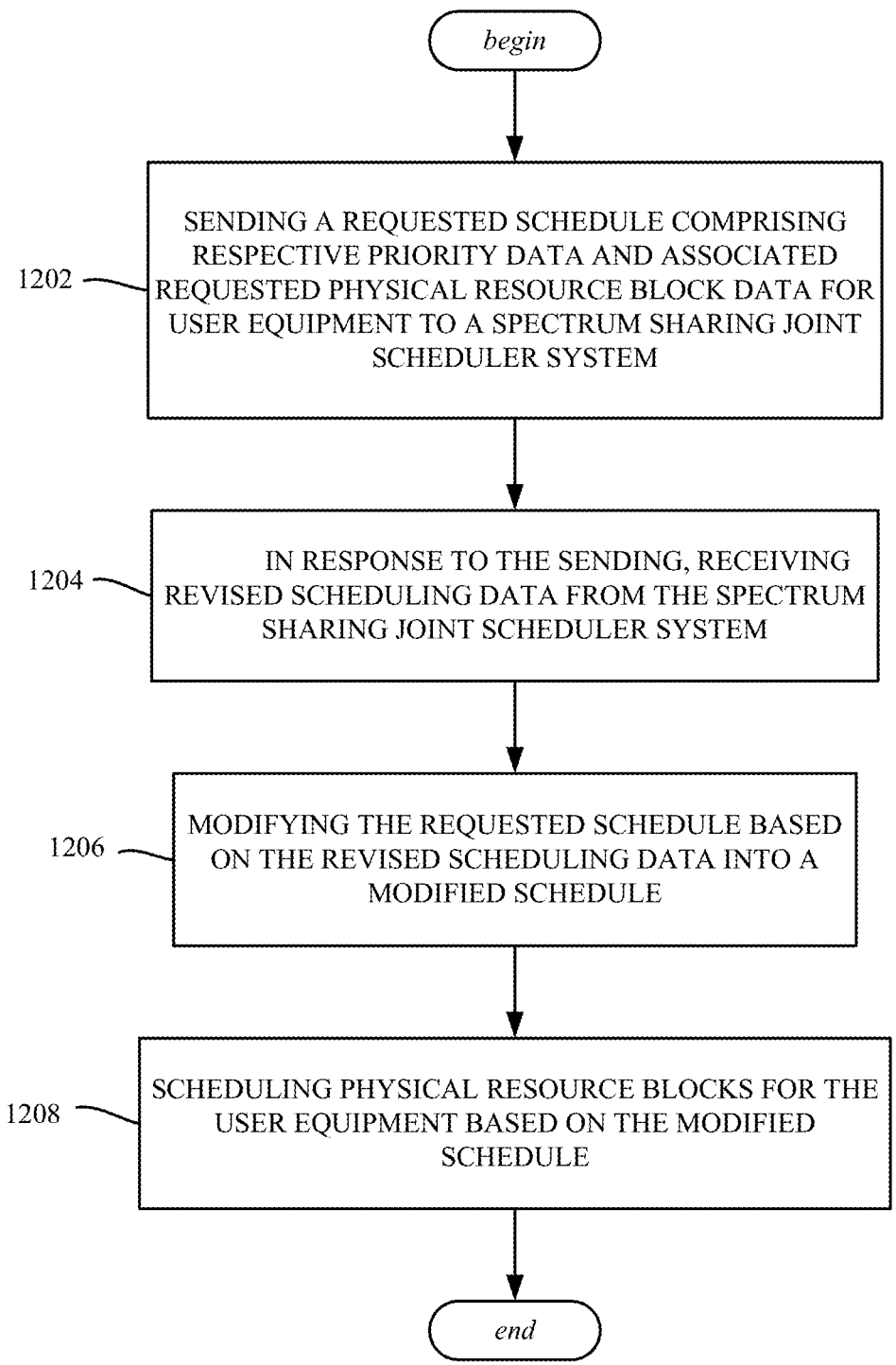
FIG. 12 illustrates example operations of a user equipment to modify a requested schedule based on joint scheduling data in a spectrum sharing environment, in accordance with various aspects and embodiments of the subject disclosure.

One or more aspects are represented in FIG. 12, such as implemented in a machine-readable storage medium, comprising executable instructions that, when executed by a processor of a user equipment, facilitate performance of operations. Example operation 1202 represents sending a requested schedule comprising respective priority data and associated requested physical resource block data for user equipment to a spectrum sharing joint scheduler system. Example operation 1204 represents, in response to the sending, receiving revised scheduling data from the spectrum sharing joint scheduler system. Example operation 1206 represents modifying the requested schedule based on the revised scheduling data into a modified schedule. Example operation 1208 represents scheduling physical resource blocks for the user equipment based on the modified schedule.

Further operations can include determining the priority data for each of the user equipment.

The revised scheduling data can include a quantity of available physical resource blocks, and modifying the requested schedule can include truncating a physical resource block of the physical resource blocks associated with a user equipment of the user equipment.

The revised scheduling data can include a quantity of available physical resource blocks, and scheduling the physical resource blocks can include scheduling the quantity of the available physical resource blocks from a lower available frequency towards a higher available frequency.

The revised scheduling data can include a quantity of available physical resource blocks, and scheduling the physical resource blocks can include scheduling the quantity of the available physical resource blocks from a higher available frequency towards a lower available frequency.

As can be seen, the technology described herein considers UE throughput and scheduling fairness within each network, as well as in Inter Radio Access Technology (IRAT) networks, including when there are different QoS requirements for LTE UEs and NR UEs. The joint scheduling can improve the network and UE performance for both LTE and NR cells, in which the throughput and scheduling fairness are considered, which can be valuable, including with 5G applications with high data rate and/or low latency requirements running in a dynamic spectrum sharing network Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g.

interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 13:
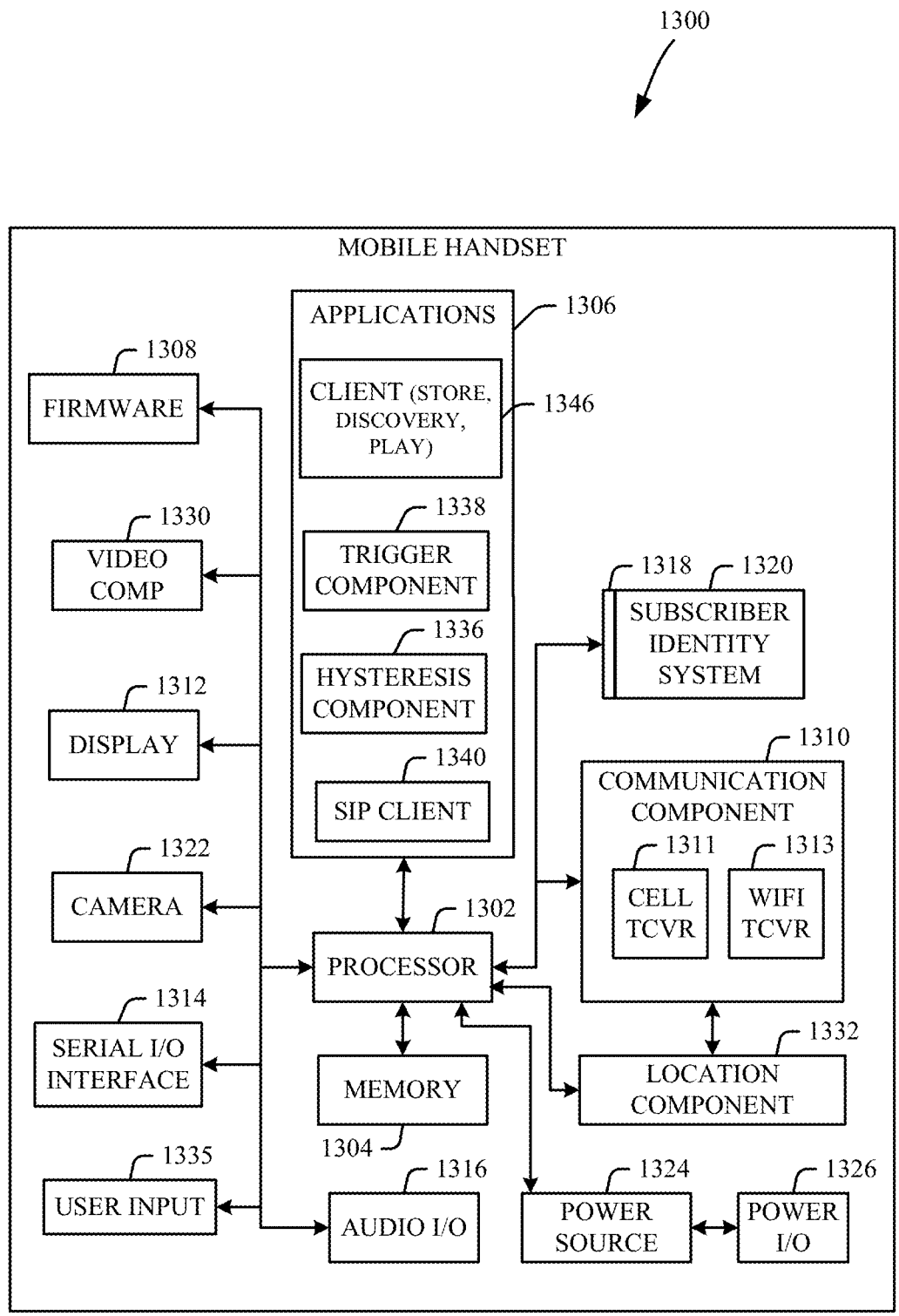
FIG. 13 illustrates an example block diagram of an example mobile handset operable to engage in a system architecture that facilitates wireless communications according to one or more embodiments described herein.

Referring now to FIG. 13, illustrated is a schematic block diagram of an example end-user device such as a user equipment) that can be a mobile device 1300 capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 810, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
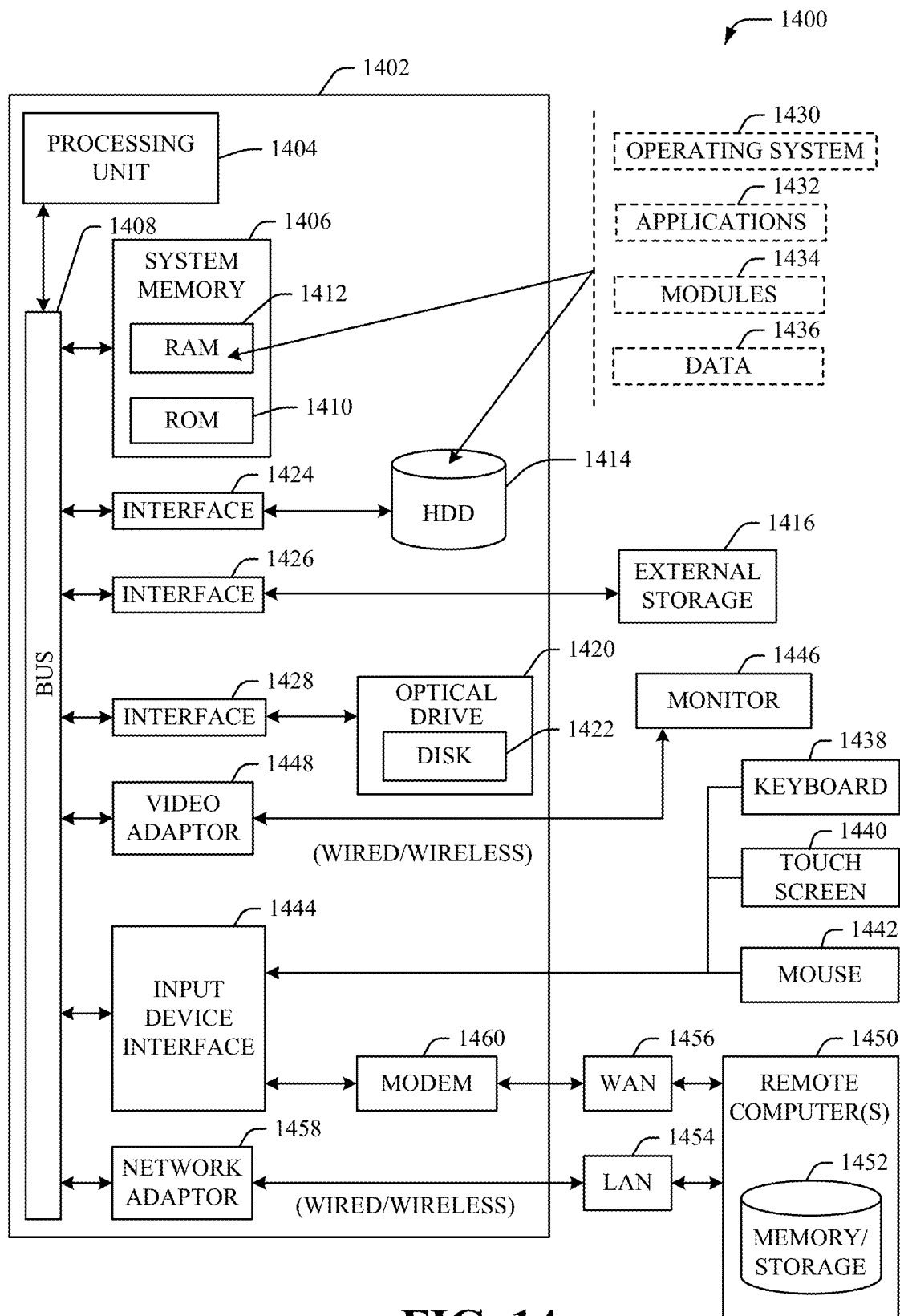
FIG. 14 illustrates an example block diagram of an example computer/machine system operable to engage in a system architecture that facilitates wireless communications according to one or more embodiments described herein.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.).

While the internal HDD 1414 is illustrated as located within the computer 1402, the internal HDD 1414 can also be configured for external use in a suitable chassis (not shown). Additionally, while not shown in environment 1400, a solid state drive (SSD), non-volatile memory and other storage technology could be used in addition to, or in place of, an HDD 1414, and can be internal or external. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally include emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can include one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 14 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    obtaining, at a joint scheduler system comprising a processor, first scheduling information for application to a fourth generation long term evolution cell site, the first scheduling information corresponding to an upcoming transmission time interval in a spectrum sharing environment, wherein the first scheduling information comprises a first group of fourth generation long term evolution user equipment identifiers with first respective priority values and first respective requested resource block data;
    obtaining, at the joint scheduler system, second scheduling information associated with a new radio cell site, the second scheduling information corresponding to the upcoming transmission time interval in the spectrum sharing environment, wherein the second scheduling information comprises a second group of new radio user equipment identifiers with second respective priority values and second respective requested resource block data;
    processing the first scheduling information and the second scheduling information to determine joint scheduling information, comprising merging the first group and the second group into a combined group of the fourth generation long term evolution user equipment identifiers with the first respective priority values and the new radio user equipment identifiers with the second respective priority values, and sorting the combined group by the first and the second respective priority values; and
    based on the joint scheduling information, allocating first resource blocks for first data transmissions by the fourth generation long term evolution cell site within the upcoming transmission time interval, and allocating second resource blocks for second data transmissions by the new radio cell site within the upcoming transmission time interval.

2. The method of claim 1, further comprising returning first quantity information to the fourth generation long term evolution cell site corresponding to a first number of the first resource blocks allocated for the first data transmissions, and returning second quantity information to the new radio cell site corresponding to a second number of second resource blocks allocated for the second data transmissions.

3. The method of claim 1, wherein allocating the first resource blocks for the first data transmissions comprises reducing a first quantity of the first resource blocks relative to a second quantity of first requested resource blocks of the first respective requested resource block data.

4. The method of claim 1, wherein the first respective requested resource block data comprises respective first requested resource block counts, and wherein the second respective requested resource block data comprises respective second requested resource block counts.

5. The method of claim 1, further comprising returning a first allocation map to the fourth generation long term evolution cell site corresponding to first ones of the first resource blocks that are allocated for the first data transmissions, and returning a second allocation map to the new radio cell site corresponding to second ones of the second resource blocks that are allocated for the second data transmissions.

6. A system, comprising:
    a processor; and
    a memory that stores executable instructions which, when executed by the processor of the system configured for spectrum sharing between a fourth generation long term evolution cell site and a new radio cell site, facilitate performance of operations, the operations comprising:
        obtaining first scheduling information from a first scheduler system associated with the fourth generation long term evolution cell site, the first scheduling information corresponding to an upcoming communication time, wherein the first scheduling information comprises a first group of fourth generation long term evolution user equipment identifiers with first respective priority values and first respective requested resource blocks;
        obtaining second scheduling information from a second scheduler system associated with a fifth generation cell site, the second scheduling information corresponding to the upcoming communication time, wherein the second scheduling information comprises a second group of fifth generation user equipment identifiers with second respective priority values and second respective requested resource blocks;
        processing the first scheduling information and the second scheduling information to determine a joint schedule, comprising merging at least part of the first group and at least part of the second group into a combined group of the fourth generation long term evolution user equipment identifiers with the first respective priority values and the fifth generation user equipment identifiers with the second respective priority values, and sorting the combined group by the first and the second respective priority values; and based on the joint schedule, returning first data corresponding to modified first scheduling information to the fourth generation long term evolution cell site, and returning second data corresponding to modified second scheduling information to the new radio cell site.

7. The system of claim 6, wherein the upcoming communication time is represented as a transmission time interval.

8. The system of claim 6, wherein the first scheduling information corresponds to a total number of resource blocks requested by the first scheduler system, and wherein returning the first data corresponding to the modified first scheduling information comprises returning a reduced number of resource blocks, relative to the total number of resource blocks requested by the first scheduler system, to the fourth generation long term evolution cell site.

9. The system of claim 6, wherein the second scheduling information corresponds to a total number of resource blocks requested by the second scheduler system, and wherein returning the second data corresponding to the modified second scheduling information comprises returning a reduced number of resource blocks, relative to the total number of resource blocks requested by the second scheduler system, to the fifth generation cell site.

10. The system of claim 6, wherein the first scheduling information corresponds to a first total number of resource blocks requested by the first scheduler system and a second total number of resource blocks requested by the second scheduler system, and wherein returning the first data corresponding to the modified first scheduling information comprises returning a first map indicating which resource blocks of the first total number of resource blocks are allocated to the first scheduler system, and returning a second map indicating which resource blocks of the second total number of resource blocks are allocated to the second scheduler system.

11. The system of claim 6, wherein obtaining the second scheduling information from the second scheduler system associated with the new radio cell site comprises receiving the second scheduling information, from the new radio cell site, at a joint scheduler system operating at the fourth generation long term evolution cell site.

12. A non-transitory machine-readable storage medium, comprising executable instructions that, when executed by a processor of network equipment, facilitate performance of operations, the operations comprising:

sending a requested schedule comprising respective priority data and associated requested physical resource block data for a group of user equipment to a spectrum sharing joint scheduler system;

in response to the sending, receiving revised scheduling data from the spectrum sharing joint scheduler system, wherein the revised scheduling data comprises a quantity of available physical resource blocks;

modifying the requested schedule based on the revised scheduling data into a modified schedule, comprising truncating a physical resource block of physical resource blocks associated with a user equipment of the group of user equipment; and scheduling physical resource blocks for the group of user equipment based on the modified schedule.

13. The non-transitory machine-readable storage medium of claim 12, wherein the operations further comprise, determining the respective priority data for the group of user equipment based on a scheduling priority factor.

14. The non-transitory machine-readable storage medium of claim 13, wherein the scheduling priority factor comprises an amount of data to be transmitted.

15. The non-transitory machine-readable storage medium of claim 12, wherein scheduling the physical resource blocks comprises scheduling the quantity of the available physical resource blocks from a lower available frequency towards a higher available frequency.

16. The non-transitory machine-readable storage medium of claim 12, wherein scheduling the physical resource blocks comprises scheduling the quantity of the available physical resource blocks from a higher available frequency towards a lower available frequency.

17. The non-transitory machine-readable storage medium of claim 12, wherein the requested schedule is associated with a fourth generation long term evolution cell site.

18. The non-transitory machine-readable storage medium of claim 12, wherein the requested schedule is associated with a new radio cell site.

19. The non-transitory machine-readable storage medium of claim 12, wherein the requested schedule is associated with a fifth generation radio cell site.

20. The non-transitory machine-readable storage medium of claim 12, wherein the requested schedule corresponds to an upcoming transmission time interval in a spectrum sharing environment.

* * * * *